United States Patent
Chen et al.

(10) Patent No.: US 10,534,066 B2
(45) Date of Patent: Jan. 14, 2020

(54) VIRTUAL ANCHOR POINT-BASED WIRELESS POSITIONING METHOD AND DEVICE AND TERMINAL

(71) Applicant: ZTE Corporation, Shenzhen (CN)

(72) Inventors: Shijun Chen, Shenzhen (CN); Guanghui Yu, Shenzhen (CN); Liujun Hu, Shenzhen (CN); Zhaohua Lu, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 576 days.

(21) Appl. No.: 15/031,841

(22) PCT Filed: May 15, 2014

(86) PCT No.: PCT/CN2014/077601
§ 371 (c)(1),
(2) Date: Apr. 25, 2016

(87) PCT Pub. No.: WO2014/177079
PCT Pub. Date: Nov. 6, 2014

(65) Prior Publication Data
US 2016/0266232 A1 Sep. 15, 2016

(30) Foreign Application Priority Data

Oct. 25, 2013 (CN) .......................... 2013 1 0512477

(51) Int. Cl.
*G01S 5/02* (2010.01)
*G01S 19/22* (2010.01)
(Continued)

(52) U.S. Cl.
CPC .......... *G01S 5/0273* (2013.01); *G01S 5/0252* (2013.01); *G01S 19/22* (2013.01); *G01S 19/42* (2013.01); *H04L 43/16* (2013.01); *H04W 4/025* (2013.01)

(58) Field of Classification Search
CPC ...... G01S 5/0252; G01S 5/0273; G01S 19/09; G01S 19/22; G01S 19/42; H04W 4/025
(Continued)

(56) References Cited

U.S. PATENT DOCUMENTS 7,495,608 B1 2/2009 Chen
8,879,607 B2 * 11/2014 Skarp .................... H04W 4/023
375/148
2010/0309051 A1 12/2010 Moshfeghi

FOREIGN PATENT DOCUMENTS

CN 1470885 A 1/2004
CN 101299886 A 11/2008
(Continued)

OTHER PUBLICATIONS

International Search Report for corresponding application PCT/CN2014/077601 filed on May 15, 2014; dated Jul. 25, 2014.
(Continued)

*Primary Examiner* — Dao L Phan
(74) *Attorney, Agent, or Firm* — Cantor Colburn LLP (57) ABSTRACT

Provided are a virtual anchor point-based wireless positioning method and device, and terminal. The method includes: when an effective positioning condition is met, positioning data is acquired and stored, multipath analysis and tracking is simultaneously performed on received wireless signals transmitted by a signal transmission station, propagation distance information of each path of the signal transmission station is calculated and stored, and virtual image position information of each path of the signal transmission station is calculated and stored according to the positioning data and
(Continued)

the propagation distance information of each path of the signal transmission station; and when the condition is not met, at least one virtual image is selected from virtual images of multiple paths of the signal transmission station as at least one positioning virtual anchor point, and current position information is obtained according to the effective positioning condition and the at least one positioning virtual anchor point.

18 Claims, 6 Drawing Sheets

(51) Int. Cl.
  *G01S 19/42* (2010.01)
  *H04L 12/26* (2006.01)
  *H04W 4/02* (2018.01)
(58) Field of Classification Search
  USPC ...... 342/357.2, 357.25, 357.61, 453; 455/65, 455/456.3
  See application file for complete search history.

(56) References Cited

FOREIGN PATENT DOCUMENTS

CN 102395196 A 3/2012
WO 2012095922 A1 7/2012

OTHER PUBLICATIONS

European Search Report for corresponding application EP14792321; dated Nov. 16, 2017.

Gentner C., "Accurate Indoor Positioning Using Multipath Components" m GNSS 2013, Proceedings of the 26th International Technical Meeting . . . , Sep. 20, 2013, pp. 983-990, XP056007359.

Paul Meissner, et al., "UWB positioning with virtual anchors and floor plan information", Positioning Navigation and Communication, Mar. 11, 2010, pp. 150-156, XP031812020.

* cited by examiner

VIRTUAL ANCHOR POINT-BASED WIRELESS POSITIONING METHOD AND DEVICE AND TERMINAL

TECHNICAL FIELD

The present disclosure relates to the technical field of wireless communications, and in particular to a virtual anchor point-based wireless positioning method and device, and a terminal.

BACKGROUND

With the development of the times, the mobile phone positioning technology has drawn more and more attentions. However, all of the currently used positioning technologies, such as a Global Positioning System (GPS) positioning technology, a wireless sensor network-based positioning technology, or other positioning means, have their respective limits. In order to achieve higher positioning accuracy, combination of multiple positioning systems for cooperative positioning (also called multimode positioning) is a direction for future development. Multimode positioning can utilize advantages of various positioning methods to achieve higher positioning accuracy and response speed and also cover a wider range to implement seamless and accurate positioning.

For example, a satellite positioning system and a mobile communication system are organically combined for mobile phone positioning. Advantages of large coverage area and high open space positioning accuracy of the satellite positioning system and high indoor and dense urban area positioning accuracy of a mobile communication network are fully utilized, so that a market requirement is better met.

Figure 1:
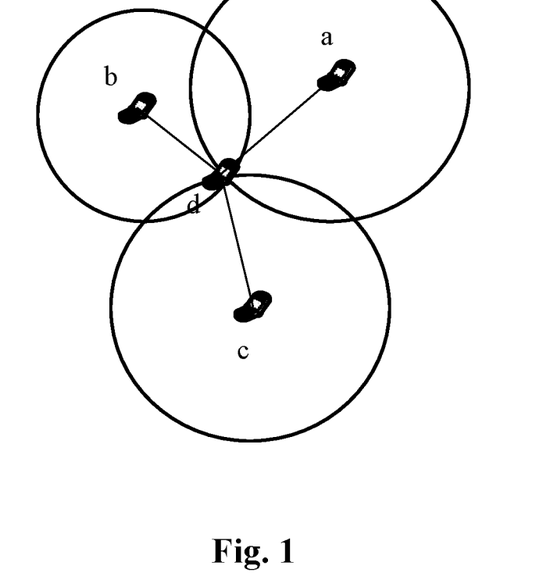
FIG. 1 is a diagram of positioning with a spherical equation in the related art.
Figure 2:
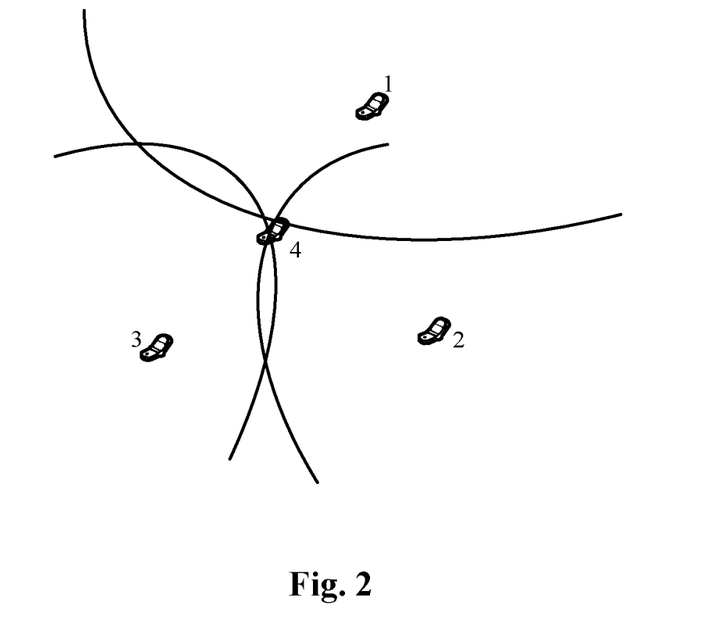
FIG. 2 is a diagram of positioning with a hyperbolic equation in the related art.

It is known that, as shown in FIG. 1 and FIG. 2, positioning with a satellite positioning system is implemented by finding at least four satellites, then performing distance measurement according to time of arrival, listing at least three spherical equations or hyperbolic equations according to distances and obtaining a current position for positioning in a manner of resolving the equations.

However, in an indoor circumstance or a dense urban area, a GPS signal is highly attenuated, so that four satellites may not be completely found, GPS positioning may not be implemented, and a positioning function is restricted.

Usually, a coverage environment of a cellular network in a dense urban area and an indoor condition is obviously superior to a satellite signal, but the problem of inaccuracy of cellular positioning exists because of factors of Non Line Of Sight (NLOS), multiple paths and the like. Regarding this problem, researchers in this field have obtained some research results, but these research results are obtained on the basis of ideal assumptions, and are industrially infeasible in terms of accurate positioning. Therefore, a feasible wireless positioning method capable of providing an accurate positioning capability during a practical application is urgent to be further deeply researched and provided.

SUMMARY

In order to provide a feasible wireless positioning method capable of providing an accurate positioning capability during a practical application, the embodiments of the present disclosure provide a virtual anchor point-based wireless positioning method and device, and a terminal.

In order to achieve the purpose of the embodiments of the present disclosure, the embodiment of the present disclosure is implemented by adopting the following technical solutions.

A virtual anchor point-based wireless positioning method is provided, which may include that:

when an effective positioning condition is met, positioning data is acquired and stored, multipath analysis and tracking is simultaneously performed on received wireless signals transmitted by a signal transmission station, propagation distance information of each path of the signal transmission station is calculated and stored, and virtual image position information of each path of the signal transmission station is calculated and stored according to the positioning data and the propagation distance information of each path of the signal transmission station; and when the effective positioning condition is not met, at least one virtual image is selected from virtual images of multiple paths of the signal transmission station as at least one positioning virtual anchor point, and current position information is obtained according to the effective positioning condition and the at least one positioning virtual anchor point.

In an example embodiment, when the effective positioning condition is met, a method for acquiring and storing the positioning data may include, but not limited to: acquiring the positioning data through satellite positioning or acquiring the positioning data through cellular positioning of a mobile communication system.

In an example embodiment, the positioning data may include positioning time information and position information.

In an example embodiment, a method for performing multipath analysis and tracking on the received wireless signals transmitted by the signal transmission station is implemented as follows:

the received multipath signals are separated by a signal analysis technology, the multipath signals are continuously tracked in a time domain, and if an existence time length of a single path is lower than a preset time length threshold and/or signal strength of the single path is lower than a preset signal strength threshold, tracking of the single path is stopped.

In an example embodiment, after multipath analysis and tracking is performed on the received wireless signals transmitted by the signal transmission station, a method for calculating and storing the propagation distance information of each path of the signal transmission station may be implemented as follows:

a signal propagation time length of each path is acquired; and a path propagation distance is obtained according to the signal propagation time length and a physical light speed constant, and the obtained path propagation distance, a path serial number of a corresponding path and time information are continuously stored as the propagation distance information of each path of the signal transmission station.

In an example embodiment, when the virtual image position information of each path of the signal transmission station is calculated according to the positioning data and the propagation distance information of each path of the signal transmission station, real position information of the signal transmission station is acquired in advance, and a method for acquiring the real position information may include, but not limited to:

acquiring the real position information of the signal transmission station from the signal transmission station through signaling, wherein the signal transmission station may acquire and store the real position information by at least one positioning method;

or, locally and directly acquiring pre-stored real position information, measured by an engineering reconnaissance method, of the signal transmission station.

In an example embodiment, calculating the virtual image position information of each path of the signal transmission station according to the positioning data and the propagation distance information of each path of the signal transmission station may include that:

at least three pieces of positioning data of which effective position differences are greater than a first preset threshold are selected from storage records of the positioning data;

the corresponding path propagation distance information is extracted from storage records of the path propagation distances according to time indexes of the positioning data; and a virtual image position of each path of the signal transmission station is calculated according to the positioning data and the path propagation distances.

In an example embodiment, when the effective positioning condition is not met, bases for selecting the at least one virtual image from the virtual images of the multiple paths of the signal transmission station as the at least one positioning virtual anchor point may be that:

a path signal strength of the corresponding path exceeds a second preset threshold; and last few continuous virtual image position changes of each path of the signal transmission station are smaller than a third preset threshold.

In an example embodiment, when the current position information is obtained according to the effective positioning condition and the at least one positioning virtual anchor point, the at least one positioning virtual anchor point may be at least one selected positioning virtual anchor point of which signal strength exceeds a fourth preset threshold.

A virtual anchor point-based wireless positioning device is provided, which may include:

a multipath separation and tracking module, configured to perform multipath analysis and tracking on received wireless signals transmitted by a signal transmission station;

a multipath distance measurement module, configured to calculate and store propagation distance information of each path of the signal transmission station;

a virtual anchor point processing module, configured to calculate and store virtual image position information of each path of the signal transmission station according to positioning data and the propagation distance information of each path of the signal transmission station;

a virtual anchor point selection module, configured to, when an effective positioning condition is not met, select at least one virtual image from virtual images of multiple paths of the signal transmission station as at least one positioning virtual anchor point; and a position calculation module, configured to, when the effective positioning condition is met, acquire and store the positioning data and further configured to, when the effective positioning condition is not met, obtain current position information according to the effective positioning condition and the at least one positioning virtual anchor point.

In an example embodiment, when the effective positioning condition is met, a method for the position calculation module to acquire and store the positioning data may include, but not limited to: acquiring the positioning data through satellite positioning or acquiring the positioning data through cellular positioning of a mobile communication system.

In an example embodiment, the positioning data may include positioning time information and position information.

In an example embodiment, the multipath separation and tracking module may include:

a separation and tracking processing module, configured to separate received multipath signals by a signal analysis technology, and continuously track, in a time domain, the multipath signals; and a multipath rejection module, configured to, if an existence time length of a single path is lower than a preset time length threshold and/or signal strength of the single path is lower than a preset signal strength threshold, send a command of stopping tracking of the corresponding path to the separation and tracking processing module.

In an example embodiment, the multipath distance measurement module may include:

an acquisition module, configured to acquire a signal propagation time length of each path;

a calculation module, configured to obtain a path propagation distance according to the signal propagation time length and a physical light speed constant; and a storage module, configured to continuously store the obtained path propagation distance, a path serial number of a corresponding path and time information as the propagation distance information of each path of the signal transmission station.

In an example embodiment, the multipath distance measurement module may further include:

a first acquisition module, configured to acquire real position information of the signal transmission station from the signal transmission station, wherein the signal transmission station may acquire and store the real position information by at least one positioning method or store real position information measured by an engineering reconnaissance method;

or, a second acquisition module, configured to locally and directly acquire the pre-stored real position information, measured by the engineering reconnaissance method, of the signal transmission station.

In an example embodiment, the virtual anchor point processing module may include:

a selection module, configured to select, from storage records of the positioning data, at least three pieces of positioning data of which effective position differences are greater than a first preset threshold;

an extraction module, configured to extract the corresponding path propagation distance information from storage records of the path propagation distances according to time indexes of the positioning data; and a processing module, configured to calculate a virtual image position of each path of the signal transmission station according to the positioning data and the path propagation distances.

In an example embodiment, when the effective positioning condition is not met, bases for the virtual anchor point selection module to select the at least one virtual image from the virtual images of the multiple paths of the signal transmission station as the at least one positioning virtual anchor point may be that:

a path signal strength of the corresponding path exceeds a second preset threshold; and last few continuous virtual image position changes of each path of the signal transmission station are smaller than a third preset threshold.

In an example embodiment, when the position calculation module obtains the current position information according to the effective positioning condition and the at least one positioning virtual anchor point, the at least one positioning virtual anchor point may be at least one selected positioning virtual anchor point of which signal strength exceeds a fourth preset threshold.

A terminal is provided, which may include the above-mentioned virtual anchor point-based wireless positioning device, the virtual anchor point-based wireless positioning device including:

a multipath separation and tracking module, configured to perform multipath analysis and tracking on received wireless signals transmitted by a signal transmission station;

a multipath distance measurement module, configured to calculate and store propagation distance information of each path of the signal transmission station;

a virtual anchor point processing module, configured to calculate and store virtual image position information of each path of the signal transmission station according to positioning data and the propagation distance information of each path of the signal transmission station;

a virtual anchor point selection module, configured to, when an effective positioning condition is not met, select at least one virtual image from virtual images of multiple paths of the signal transmission station as at least one positioning virtual anchor point; and a position calculation module, configured to, when the effective positioning condition is met, acquire and store the positioning data and further configured to, when the effective positioning condition is not met, obtain current position information according to the effective positioning condition and the at least one positioning virtual anchor point.

From the technical solutions of the embodiments of the present disclosure, the virtual anchor point-based wireless positioning method and device, and the terminal provided by the present disclosure, compared with a related art, at least have the following beneficial effects.

According to the embodiments of the disclosure, multiple positioning methods are integrated, and in a rich multipath scenario (for example, an indoor environment and a dense urban area), continuously recorded virtual anchor points of multiple paths of a practical wireless signal transmission station are combined with another effective positioning condition for positioning, so that multipath information is fully utilized, positioning errors caused by signal reflection and diffraction are reduced, and in addition, the problem of insufficient effective positioning anchor points is solved.

Achievement of the purpose, function characteristics and good effects of the present disclosure will be further described below with reference to specific embodiments and the drawings.

DETAILED DESCRIPTION OF THE EMBODIMENTS

The technical solutions of the present disclosure will be further described below with reference to the drawings and specific embodiments in detail to make those skilled in the art better understand and implement the present disclosure, but the enumerated embodiments are not intended to limit the present disclosure.

Figure 3:
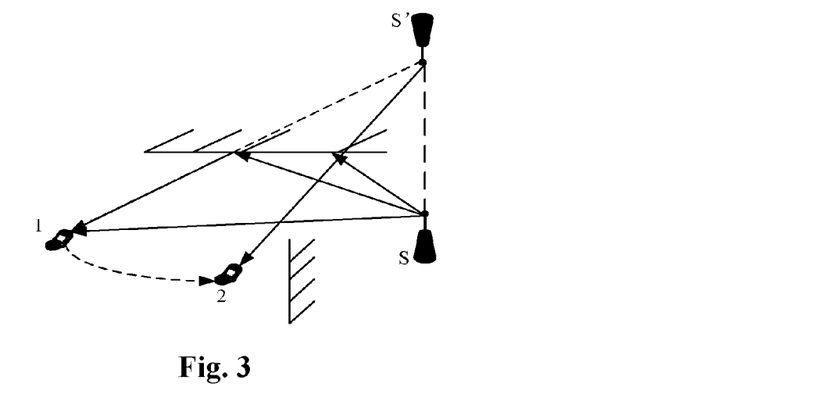
FIG. 3 is a schematic diagram of a practical virtual image during reflection propagation of an electromagnetic wave.
Figure 4:
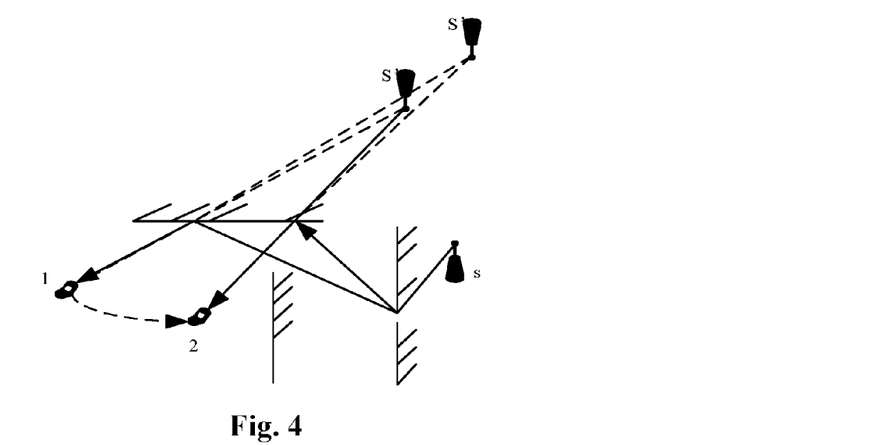
FIG. 4 is a schematic diagram of a practical virtual image during sequential diffraction and reflection propagation of an electromagnetic wave.

A core idea of the technical solution provided in the embodiments of the present disclosure is to implement wireless positioning in a complex wireless multipath environment such as an indoor environment and a dense urban area through virtual anchor points on the basis of multipath tracking and identification. A virtual anchor point of a real anchor point refers to a position of a virtual signal transmission source after a receiver supposes that a signal is linearly transmitted and is not diffracted and reflected after the signal transmitted by the real anchor point is received by the receiver. FIG. 3 shows a schematic diagram of a practical virtual image during reflection propagation of an electromagnetic wave, and as shown in FIG. 4, a wireless signal transmitted by a signal transmission source S reaches terminal 1 or 2 after being reflected by a reflector, and if a reflecting surface of the reflector does not change, a position S' of a virtual image of the signal transmission source S (anchor point) relative to terminal 1 or 2 is kept unchanged. A positioning method in the related art uses a real anchor point position coordinate and solves a distance equation to obtain a position of terminal 1 or 2, and the inventor of the present disclosure discovers that a positioning result obtained by such a method in the related art may have a great error under the condition that the signal is reflected greatly.

Figure 5:
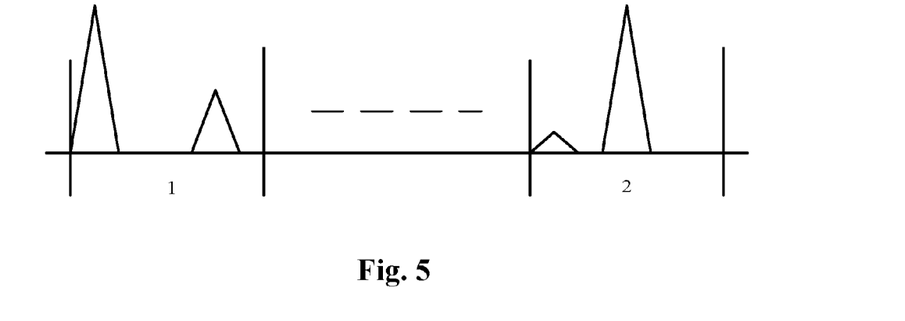
FIG. 5 is a diagram of multipath separation.

In addition, according to the embodiments of the present disclosure, a terminal may also be positioned according to a virtual image if a diffraction point is far away from the terminal to be positioned under the condition of existence of diffraction. As shown in FIG. 5, a signal of a base station is sequentially diffracted and reflected to reach the terminal, a position, calculated by the terminal, of a virtual image may be automatically regulated to be farer, and in case of a long distance, a change in the virtual image is observed to be small when the mobile terminal moves. Moreover, the signal is reflected for many times, and the position of the virtual image may not change along with movement of the terminal to be positioned. Referring to FIG. 5, under the condition of multiple propagation paths, a received signal is an envelope in a time domain, and time differences among signal envelopes are caused by different propagation path distances. According to the embodiments of the present disclosure, a position of a terminal is calculated and determined by virtue of a position of a virtual image of an anchor point, so as to reduce the problem of positioning error caused by multipath reflection.

Figure 6:
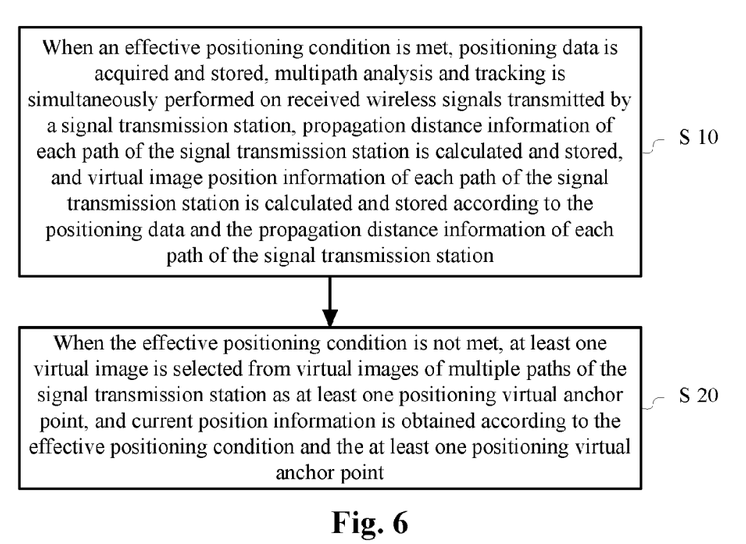
FIG. 6 is a flowchart of a virtual anchor point-based wireless positioning method according to an embodiment of the present disclosure.

Referring to FIG. 6, an embodiment of the present disclosure provides a virtual anchor point-based wireless positioning method, which includes:

Step S10: when an effective positioning condition is met, positioning data is acquired and stored, multipath analysis and tracking is simultaneously performed on received wireless signals transmitted by a signal transmission station, propagation distance information of each path of the signal transmission station is calculated and stored, and virtual image position information of each path of the signal transmission station is calculated and stored according to the positioning data and the propagation distance information of each path of the signal transmission station; and Step S20: when the effective positioning condition is not met, at least one virtual image is selected from virtual images of multiple paths of the signal transmission station as at least one positioning virtual anchor point, and current position information is obtained according to the effective positioning condition and the at least one positioning virtual anchor point.

For example, in the embodiment of the present disclosure, for Step S10, a method for a signal receiving station (such as User Equipment (UE), the UE may be in a moving or still state) to acquire the positioning data may be implemented as follows:

if the signal receiving station can find sufficient satellites, a position calculation method the same as that of the signal transmission station is used, and if the signal receiving station uses integration information of satellite and virtual anchor point, then:

suppose that a space coordinate of the signal receiving station is ($\alpha$, x, y, z), a spherical equation set is listed according to distances away from the satellites and distances away from virtual anchor points, and the coordinate of the signal receiving station is solved; and if satellite anchor points are not included, the coordinate of the signal receiving station is set to be (x, y, z), a spherical equation set is listed according to the distances away from the virtual anchor points, and the coordinate of the signal receiving station is solved.

In the embodiment, for Step S10, when the effective positioning condition is met, acquiring and storing the positioning data includes, acquiring the positioning data through satellite positioning or acquiring the positioning data through cellular positioning of a mobile communication system.

In an example embodiment, the positioning data may include positioning time information and position information.

For Step S10, a method for performing multipath analysis and tracking on the received wireless signals transmitted by the signal transmission station is implemented as follows:

the received multipath signals are separated by a signal analysis technology, the multipath signals are continuously tracked in a time domain, and if an existence time length of a single path is lower than a preset time length threshold and/or signal strength of the single path is lower than a preset signal strength threshold, tracking of the single path is stopped.

For Step S10, after multipath analysis and tracking is performed on the received wireless signals transmitted by the signal transmission station, a method for calculating and storing the propagation distance information of each path of the signal transmission station is implemented as follows:

Step S101: a signal propagation time length of each path is acquired; and

Step S102: a path propagation distance is obtained according to the signal propagation time length and a physical light speed constant, and the obtained path propagation distance, a path serial number of a corresponding path and time information are continuously stored as the propagation distance information of each path of the signal transmission station.

For Step S10, when the virtual image position information of each path of the signal transmission station is calculated according to the positioning data and the propagation distance information of each path of the signal transmission station, real position information of the signal transmission station may be acquired in advance, wherein a method for acquiring the real position information of the signal transmission station may include, but not limited to:

1: acquiring the real position information of the signal transmission station from the signal transmission station through signaling, wherein the signal transmission station acquires and stores the real position information by at least one positioning method or stores the real position information measured by an engineering reconnaissance method;

2: or, locally and directly acquiring pre-stored real position information, measured by the engineering reconnaissance method, of the signal transmission station.

In the embodiment of the present disclosure, a method for the signal transmission station to acquire the real position information by at least one method is implemented as follows:

the space coordinate of the signal transmission station is set to be ($\alpha$, x, y, z), wherein $\alpha$ represents a timing difference between the signal transmission station and the satellite, and x, y and z represent the space coordinate of the signal transmission station; the signal transmission station may find at least 4 GPS satellites and measure distances di between the signal transmission station and the at least 4 satellites. An equation set is listed according to spherical equations, and the coordinate of the signal transmission station is solved; or subtraction is performed on the distances between the signal transmission station and the two satellites, a hyperbolic equation set is listed, and the coordinate of the signal transmission station is solved.

For Step S10, a method for calculating the virtual image position information of each path of the signal transmission station according to the positioning data and the propagation distance information of each path of the signal transmission station includes:

Step S103: at least three pieces of positioning data of which effective position differences are greater than a first preset threshold are selected from storage records of the positioning data;

Step S104: the corresponding path propagation distance information is extracted from storage records of the path propagation distances according to time indexes of the positioning data; and Step S105: a virtual image position of each path of the signal transmission station is calculated according to the positioning data and the path propagation distances.

In Step S20, for example, whether the current effective positioning condition is met or not may be judged in a manner as follows:

1: if the number of the found satellites is more than or equal to 4, a positioning anchor point set only includes the satellites; and 2: or, if the number of the found satellites is smaller than 4, the positioning anchor point set includes the found satellites and at least one selected virtual anchor point, wherein the sum of the number of the satellites and the number of the at least one virtual anchor point is more than or equal to 4.

For Step S20, when the effective positioning condition is not met, bases for selecting the at least one virtual image from the virtual images of the multiple paths of the signal transmission station as the at least one positioning virtual anchor point are that:

first, a path signal strength of the corresponding path exceeds a second preset threshold; and second, last few continuous virtual image position changes of each path of the signal transmission station are smaller than a third preset threshold.

For Step S20, when the current position information is obtained according to the effective positioning condition and the at least one positioning virtual anchor point, the at least one positioning virtual anchor point may be at least one selected positioning virtual anchor point of which signal strength exceeds a fourth preset threshold.

In order to better describe the principle of the embodiments of the present disclosure, specific embodiments about application of the technical solution provided by the embodiments of the present disclosure to a mine, an indoor environment and a dense urban area will be enumerated.

Embodiment 1: virtual anchor point-based wireless positioning in a mine

Figure 7:
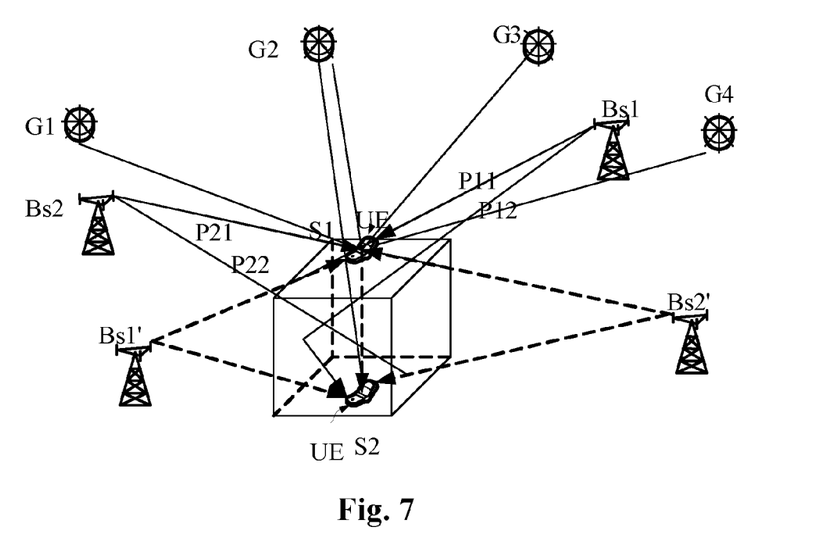
FIG. 7 is a diagram of virtual anchor point-based wireless positioning in a mine environment according to embodiment 1 of the present disclosure.

As shown in FIG. 7, in the mine, one piece of UE moves from position S1 to S2, and it is supposed that there are 4 satellites in the sky.

According to a satellite navigation positioning algorithm in the related art, at least 4 satellite signals are required to be received for positioning. In the embodiment:

when the UE is at position S1:

the UE can receive signals of totally 4 satellites GPS1, GPS2, GPS3 and GPS4, and meets an independent positioning condition, and positioning information is set to be (α, x1, y1, z1), wherein α is a time difference of a clock of the signal receiving station and the satellites, and x1, y1 and z1 are three-dimensional coordinates respectively.

The UE can simultaneously receive signals of 2 paths of base station Bs1, i.e., the UE can receive a signal of direct transmission path P11 of base station Bs1 and a signal of P12 reflected by a surface.

The UE can simultaneously receive signals of 2 paths of base station Bs2, i.e., the UE can receive a signal of direct transmission path P21 of base station Bs2 and a signal of P22 reflected by the surface.

When the UE moves from position S1 to position S2, namely gradually moves from a wellhead to a deep part of a well, the number of the found satellites is gradually reduced along with movement, and only the satellite signal of G2 can be found at S2; and along with movement, the signal of P11 of Bs1 is also gradually weakened and the signal of P21 of Bs2 is also gradually weakened because of lack of direct transmission condition.

When reaching S2, the UE can only find the signal of G2, the signal of P12 of Bs1 and the signal of P22 of Bs2.

At the wellhead, the UE can be positioned through the satellite, and a positioning coordinate of UE1 is continuously recorded.

Since the UE can simultaneously receive the signals of the two paths of Bs1, the UE continuously measures and records propagation distances of the signals of the two paths.

A position and a distance are extracted from the latest position records and path propagation distance records of the UE, a spherical equation is listed and solved to obtain and continuously record a position of a virtual image Bs1', propagated through P12, of Bs1, and since a reflecting surface changes a little, the position of Bs1' changes a little in a movement process of the UE in the embodiment.

Since the UE can simultaneously receive the signals of the two paths of Bs2, the UE continuously measures and records propagation distances of the signals of the two paths.

A position and a distance are extracted from the latest position records and path propagation distance records of the UE, a spherical equation is listed and solved to obtain and continuously record a position of a virtual image Bs2', propagated through P22, of Bs2, and since a reflecting surface changes a little, the position of Bs2' changes a little in a movement process of the UE in the embodiment When the UE moves to S2, the UE can receive only one satellite, so that virtual images Bs1' and Bs2' are selected as virtual anchor points.

A coordinate of the UE is set to be (x, y, z).

According to positions and distances between UE1 and three anchor points G2, Bs1' and Bs2', a distance equation is listed, and the coordinate of the UE is solved.

Embodiment 2: assistant positioning of a terminal in an indoor environment

Figure 8:
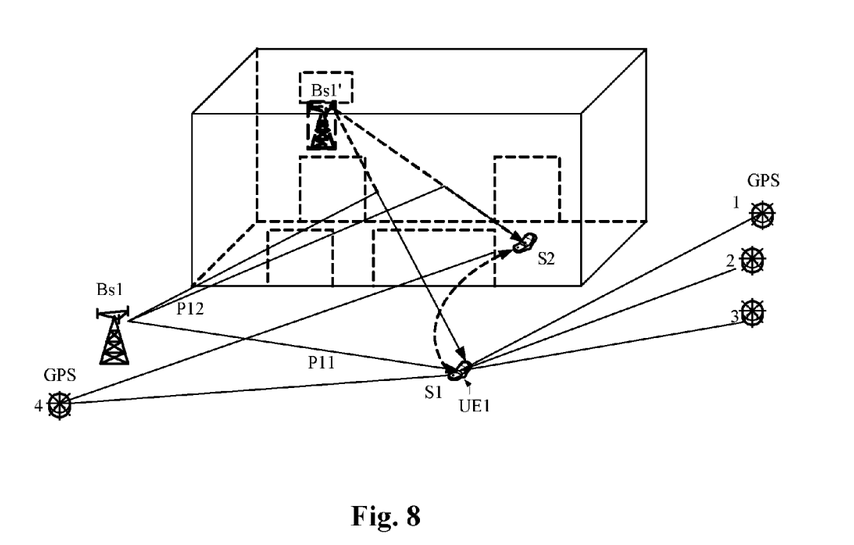
FIG. 8 is a diagram of virtual anchor point-based wireless positioning in an indoor environment according to embodiment 2 of the present disclosure.

As shown in FIG. 8, in an indoor environment, one piece of UE1 moves from position S1 to S2, and it is supposed that there are 4 satellites in the sky.

According to a satellite navigation positioning algorithm in the related art, at least 4 satellite signals are required to be received for positioning. In the embodiment:

when UE1 is at position S1:

UE1 can receive signals of totally 4 satellites GPS1, GPS2, GPS3 and GPS4, and meets an independent positioning condition, and positioning information is set to be (α, x1, y1, z1), wherein α is a time difference of a clock of UE1 and the satellites, and x1, y1 and z1 are three-dimensional coordinates respectively.

UE1 can simultaneously receive signals of 2 paths of base station Bs1, i.e., the UE can receive a signal of direct transmission path P11 of base station Bs1 and a signal of P12 reflected by a surface.

When UE1 moves from position S1 to position S2, namely gradually moves from a door deep into the inside of the room, the number of the found satellites is gradually reduced along with movement, and only the satellite signal of G4 can be found at S2; and along with movement, the signal of P11 of Bs1 is also gradually weakened because of lack of direct transmission condition.

When reaching S2, UE1 can only find the signal of G2 and the signal of P12 of Bs1.

UE1 can be positioned through the satellite outdoors, and a positioning coordinate of UE1 is continuously recorded.

Since UE1 can simultaneously receive the signals of the two paths of Bs1, UE1 continuously measures and records propagation distances of the signals of the two paths.

A position and a distance are extracted from the latest position records and path propagation distance records of UE1, a spherical equation is listed and solved to obtain and continuously record a position of a virtual image Bs1', propagated through P12, of Bs1, and since a reflecting surface changes a little, the position of Bs1' changes a little in a movement process of UE1 in the embodiment.

When UE1 moves to S2, UE1 can only receive one satellite and path P12, so that virtual image Bs1' is selected as a virtual anchor point.

According to a building map, a coordinate of UE1 may be set to be (x, y) in a horizontal plane inside the room.

According to positions and distances of UE1 and two anchor points G2 and Bs1', a distance equation is listed, and the coordinate of UE1 is solved.

Embodiment 3: positioning in a dense urban area

Figure 9:
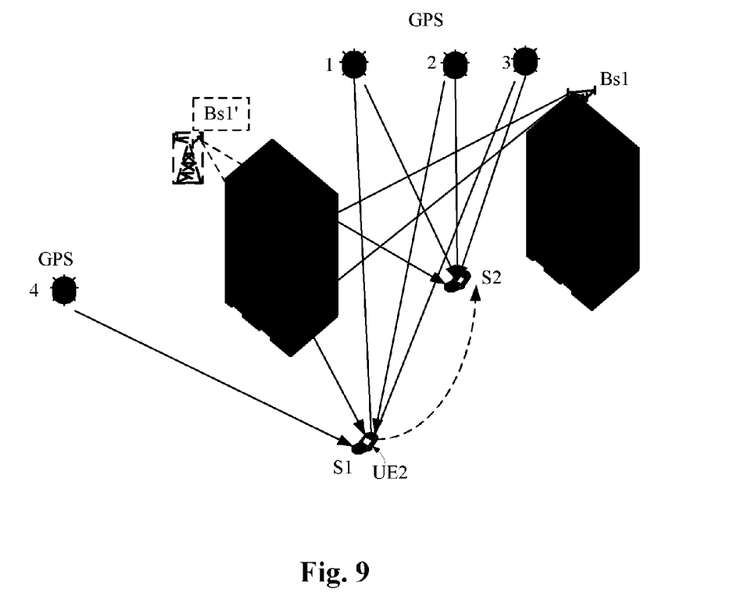
FIG. 9 is a diagram of virtual anchor point-based wireless positioning in a dense urban area environment according to embodiment 3 of the present disclosure.

As shown in FIG. 9, when surrounded by buildings, one piece of UE moves from position S1 to S2, and it is supposed that there are 4 satellites in the sky.

According to a satellite navigation positioning algorithm in the related art, at least 4 satellite signals are required to be received for positioning. In the embodiment:

when the UE is at position S1:

the UE can receive signals of totally 4 satellites GPS1, GPS2, GPS3 and GPS4, and meets an independent positioning condition, and positioning information is set to be ($\alpha$, x1, y1, z1), wherein $\alpha$ is a time difference of a clock of the UE and the satellites, and x1, y1 and z1 are three-dimensional coordinates respectively.

The UE can simultaneously receive signals of 2 paths of base station Bs1, i.e., the UE can receive a signal of P12, reflected by a surface, of Bs1.

When the UE moves from position S1 to position S2, namely gradually moves to a shadow area of the building, the number of the found satellites is gradually reduced along with movement, and the satellite signal of G4 may not be found at S2; and the signal of P12 of Bs1 can be found all the time in a movement process.

When reaching S2, the UE may find the signals of GPS1, GPS2 and GPS3 and the signal of P12 of Bs1.

At S1, the UE can be positioned through the satellites, and a positioning coordinate of the UE is continuously recorded.

Since the UE can simultaneously receive the signal of P12 of Bs1, the UE continuously measures and records propagation distances of the signal.

A position and a distance are extracted from the latest position records and path propagation distance records of the UE, a spherical equation is listed and solved to obtain and continuously record a position of a virtual image Bs1', propagated through P12, of Bs1, and since a reflecting surface changes a little, the position of Bs1' changes a little in a movement process of the UE in the embodiment.

When the UE moves to S2, the UE can only receive the signals of one satellite and P12, so that virtual image Bs1' is selected as a virtual anchor point.

According to a building map, the coordinate of the UE may be set to be (x, y) in a horizontal plane in the current environment.

According to positions and distances of the UE and two anchor points G2 and Bs1', a distance equation is listed, and the coordinate of the UE is solved.

Figure 10:
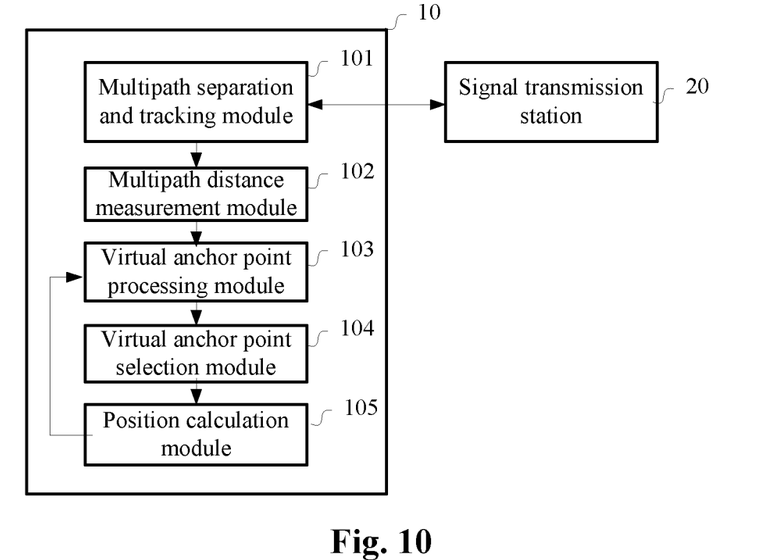
FIG. 10 is a structure diagram of a virtual anchor point-based wireless positioning device according to an embodiment of the present disclosure.

As shown in FIG. 10, an embodiment of the present disclosure further provides a virtual anchor point-based wireless positioning device 10, which includes:

a multipath separation and tracking module 101, configured to perform multipath analysis and tracking on received wireless signals transmitted by a signal transmission station 20;

a multipath distance measurement module 102, configured to calculate and store propagation distance information of each path of the signal transmission station;

a virtual anchor point processing module 103, configured to calculate and store virtual image position information of each path of the signal transmission station 20 according to positioning data and the propagation distance information of each path of the signal transmission station;

a virtual anchor point selection module 104, configured to, when an effective positioning condition is not met, select at least one virtual image from virtual images of multiple paths of the signal transmission station as at least one positioning virtual anchor point; and a position calculation module 105, configured to, when the effective positioning condition is met, acquire and store the positioning data, wherein the positioning data may, for example, be acquired and stored according to a satellite positioning method when the effective positioning condition is met; and further configured to, when the effective positioning condition is not met, obtain current position information according to the effective positioning condition and the at least one positioning virtual anchor point.

In the embodiment, when the effective positioning condition is met, a method for the position calculation module 105 to acquire and store the positioning data includes, but not limited to: acquiring the positioning data through satellite positioning or acquiring the positioning data through cellular positioning of a mobile communication system.

Wherein the positioning data includes positioning time information and position information.

Figure 11:
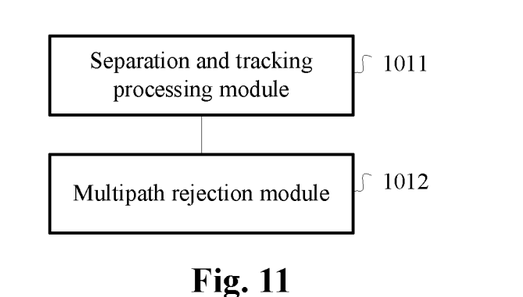
FIG. 11 is a function structure diagram of a multipath separation and tracking module according to an embodiment of the present disclosure.

In the embodiment, referring to FIG. 11, the multipath separation and tracking module 101 includes:

a separation and tracking processing module 1011, configured to separate received multipath signals by a signal analysis technology, and continuously track, in a time domain, the multipath signals; and a multipath rejection module 1012, configured to, if an existence time length of a single path is lower than a preset time length threshold and/or signal strength of the single path is lower than a preset signal strength threshold, send a command of stopping tracking of the corresponding path to the separation and tracking processing module.

Figure 12:
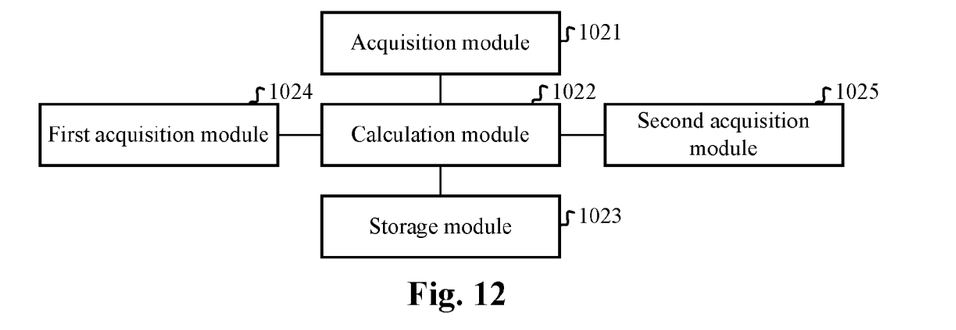
FIG. 12 is a function structure diagram of a multipath distance measurement module according to an embodiment of the present disclosure.

In the embodiment, referring to FIG. 12, the multipath distance measurement module 102 includes:

an acquisition module 1021, configured to acquire a signal propagation time length of each path;

a calculation module 1022, configured to obtain a path propagation distance according to the signal propagation time length and a physical light speed constant; and a storage module 1023, configured to continuously store the obtained path propagation distance, a path serial number of a corresponding path and time information as the propagation distance information of each path of the signal transmission station.

In the embodiment, still referring to FIG. 12, the multipath distance measurement module further includes:

a first acquisition module 1024, configured to acquire real position information of the signal transmission station 20 from the signal transmission station, wherein the signal transmission station 20 acquires and stores the real position information by at least one positioning method or stores real position information measured by an engineering reconnaissance method;

or, a second acquisition module 1025, configured to locally and directly acquire the pre-stored real position information, measured by the engineering reconnaissance method, of the signal transmission station.

Figure 13:
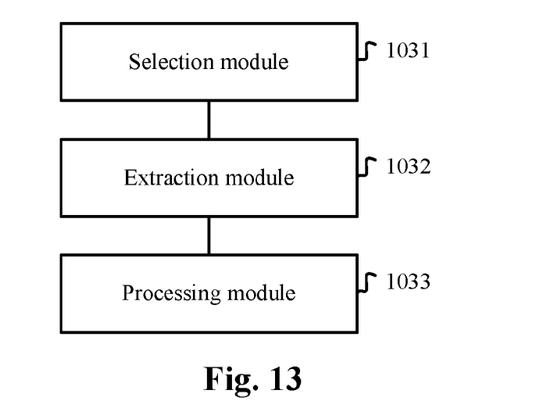
FIG. 13 is a function structure diagram of a virtual anchor point processing module according to an embodiment of the present disclosure.

In the embodiment, referring to FIG. 13, the virtual anchor point processing module 103 includes:

a selection module 1031, configured to select, from storage records of the positioning data, at least three pieces of positioning data of which effective position differences are greater than a first preset threshold;

an extraction module 1032, configured to extract the corresponding path propagation distance information from storage records of the path propagation distances according to time indexes of the positioning data; and a processing module 1033, configured to calculate a virtual image position of each path of the signal transmission station according to the positioning data and the path propagation distances.

In the embodiment, when the effective positioning condition is not met, bases for the virtual anchor point selection module 104 to select the virtual image from the virtual images of the multiple paths of the signal transmission station 20 as the positioning virtual anchor point are that:

a path signal strength of the corresponding path exceeds a second preset threshold; and last few continuous virtual image position changes of each path of the signal transmission station are smaller than a third preset threshold.

In the embodiment, when the position calculation module 105 obtains the current position information according to the effective positioning condition and the at least one positioning virtual anchor point, the at least one positioning virtual anchor point is at least one selected positioning virtual anchor point of which signal strength exceeds a fourth preset threshold.

An embodiment of the present disclosure further correspondingly provides a terminal, which includes the above-mentioned virtual anchor point-based wireless positioning device 10, still referring to FIG. 10, the virtual anchor point-based wireless positioning device 10 including:

a multipath separation and tracking module 101, configured to perform multipath analysis and tracking on received wireless signals transmitted by a signal transmission station 20;

a multipath distance measurement module 102, configured to calculate and store propagation distance information of each path of the signal transmission station;

a virtual anchor point processing module 103, configured to calculate and store virtual image position information of each path of the signal transmission station 20 according to positioning data and the propagation distance information of each path of the signal transmission station 20;

a virtual anchor point selection module 104, configured to, when an effective positioning condition is not met, select at least one virtual image from virtual images of multiple paths of the signal transmission station 20 as at least one positioning virtual anchor point; and a position calculation module 105, configured to, when the effective positioning condition is met, acquire and store the positioning data and further configured to, when the effective positioning condition is not met, obtain current position information according to the effective positioning condition and the at least one positioning virtual anchor point.

Detailed description about the virtual anchor point-based wireless positioning device 10 may refer to the above, and will not be elaborated herein.

The above is only the example embodiment of the present disclosure and thus not intended to limit the scope of patent of the present disclosure, and any equivalent structure or equivalent flow transformation made by virtue of contents of the Specification and drawings of the present disclosure or direct or indirect application of the contents to other related technical fields shall fall within the scope of protection of the present disclosure.

INDUSTRIAL APPLICABILITY

The technical solutions provided by the embodiments of the present disclosure may be applied to a virtual anchor point-based wireless positioning process. According to the embodiments of the present disclosure, multiple positioning methods are integrated, and in a rich multipath scenario (for example, an indoor environment and a dense urban area), continuously recorded virtual anchor points of multiple paths of a practical wireless signal transmission station are combined with another effective positioning condition for positioning, so that multipath information is fully utilized, positioning errors caused by signal reflection and diffraction are reduced, and in addition, the problem of insufficient effective positioning anchor points is solved.

What is claimed is:

1. A virtual anchor point-based wireless positioning method, comprising:

when an effective positioning condition is met, acquiring and storing positioning data, simultaneously performing multipath analysis and tracking on received wireless signals transmitted by a signal transmission station, calculating and storing propagation distance information of each path of the signal transmission station, and calculating and storing virtual image position information of each path of the signal transmission station according to the positioning data and the propagation distance information of each path of the signal transmission station; and when the effective positioning condition is not met, selecting at least one virtual image from virtual images of multiple paths of the signal transmission station as at least one positioning virtual anchor point, and obtaining current position information according to the effective positioning condition and the at least one positioning virtual anchor point;

wherein wherein performing multipath analysis and tracking on the received wireless signals transmitted by the signal transmission station comprises: separating received multipath signals by a signal analysis technology, continuously tracking, in a time domain, the multipath signals, and if an existence time length of a single path is lower than a preset time length threshold and/or signal strength of the single path is lower than a preset signal strength threshold, stopping tracking of the single path.

2. The virtual anchor point-based wireless positioning method as claimed in claim 1, wherein when the effective positioning condition is met, acquiring and storing the positioning data comprises: acquiring the positioning data through satellite positioning or acquiring the positioning data through cellular positioning of a mobile communication system.

3. The virtual anchor point-based wireless positioning method as claimed in claim 1, wherein the positioning data comprises: positioning time information and position information.

4. The virtual anchor point-based wireless positioning method as claimed in claim 1, wherein after performing multipath analysis and tracking on the received wireless signals transmitted by the signal transmission station, calculating and storing the propagation distance information of each path of the signal transmission station comprises:

acquiring a signal propagation time length of each path; and obtaining a path propagation distance according to the signal propagation time length and a physical light speed constant, and continuously storing the obtained path propagation distance, a path serial number of a corresponding path and time information as the propagation distance information of each path of the signal transmission station.

5. The virtual anchor point-based wireless positioning method as claimed in claim 3, wherein when calculating the virtual image position information of each path of the signal transmission station according to the positioning data and the propagation distance information of each path of the signal transmission station, real position information of the signal transmission station is acquired in advance, wherein acquiring the real position information of the signal transmission station comprises:

acquiring the real position information of the signal transmission station from the signal transmission station through signaling, wherein the signal transmission station acquires and stores the real position information by at least one positioning method;

or, locally and directly acquiring pre-stored real position information, measured by an engineering reconnaissance method, of the signal transmission station.

6. The virtual anchor point-based wireless positioning method as claimed in claim 1, wherein calculating the virtual image position information of each path of the signal transmission station according to the positioning data and the propagation distance information of each path of the signal transmission station comprises:

selecting, from storage records of the positioning data, at least three pieces of positioning data of which effective position differences are greater than a first preset threshold;

extracting the corresponding path propagation distance information from storage records of the path propagation distances according to time indexes of the positioning data; and calculating a virtual image position of each path of the signal transmission station according to the positioning data and the path propagation distances.

7. The virtual anchor point-based wireless positioning method as claimed in claim 1, wherein when the effective positioning condition is not met, bases for selecting the at least one virtual image from the virtual images of the multiple paths of the signal transmission station as the at least one positioning virtual anchor point comprise that:

a path signal strength of the corresponding path exceeds a second preset threshold; and last few continuous virtual image position changes of each path of the signal transmission station are smaller than a third preset threshold.

8. The virtual anchor point-based wireless positioning method as claimed in claim 1, wherein when obtaining the current position information according to the effective positioning condition and the at least one positioning virtual anchor point, the at least one positioning virtual anchor point is at least one selected positioning virtual anchor point of which signal strength exceeds a fourth preset threshold.

9. A virtual anchor point-based wireless positioning device, comprising:

a multipath separation and tracking module, configured to perform multipath analysis and tracking on received wireless signals transmitted by a signal transmission station;

a multipath distance measurement module, configured to calculate and store propagation distance information of each path of the signal transmission station;

a virtual anchor point processing module, configured to calculate and store virtual image position information of each path of the signal transmission station according to positioning data and the propagation distance information of each path of the signal transmission station;

a virtual anchor point selection module, configured to, when an effective positioning condition is not met, select at least one virtual image from virtual images of multiple paths of the signal transmission station as at least one positioning virtual anchor point; and a position calculation module, configured to, when the effective positioning condition is met, acquire and store the positioning data and further configured to, when the effective positioning condition is not met, obtain current position information according to the effective positioning condition and the at least one positioning virtual anchor point;

wherein the multipath separation and tracking module comprises: a separation and tracking processing module, configured to separate received multipath signals by a signal analysis technology, and continuously track, in a time domain, the multipath signals; and a multipath rejection module, configured to, if an existence time length of a single path is lower than a preset time length threshold and/or signal strength of the single path is lower than a preset signal strength threshold, send a command of stopping tracking of the corresponding path to the separation and tracking processing module.

10. The virtual anchor point-based wireless positioning device as claimed in claim 9, wherein when the effective positioning condition is met, the position calculation module is configured to acquire and store the positioning data in a manner of: acquiring the positioning data through satellite positioning or acquiring the positioning data through cellular positioning of a mobile communication system.

11. The virtual anchor point-based wireless positioning device as claimed in claim 9, wherein the positioning data comprises positioning time information and position information.

12. The virtual anchor point-based wireless positioning device as claimed in claim 9, wherein the multipath distance measurement module comprises:

an acquisition module, configured to acquire a signal propagation time length of each path;

a calculation module, configured to obtain a path propagation distance according to the signal propagation time length and a physical light speed constant; and a storage module, configured to continuously store the obtained path propagation distance, a path serial number of a corresponding path and time information as the propagation distance information of each path of the signal transmission station.

13. The virtual anchor point-based wireless positioning device as claimed in claim 12, wherein the multipath distance measurement module further comprises:

a first acquisition module, configured to acquire real position information of the signal transmission station from the signal transmission station, wherein the signal transmission station acquires and stores the real position information by at least one positioning method;

or, a second acquisition module, configured to locally and directly acquire pre-stored real position information, measured by an engineering reconnaissance method, of the signal transmission station.

14. The virtual anchor point-based wireless positioning device as claimed in claim 9, wherein the virtual anchor point processing module comprises:

a selection module, configured to select, from storage records of the positioning data, at least three pieces of positioning data of which effective position differences are greater than a first preset threshold;

an extraction module, configured to extract the corresponding path propagation distance information from storage records of the path propagation distances according to time indexes of the positioning data; and a processing module, configured to calculate a virtual image position of each path of the signal transmission station according to the positioning data and the path propagation distances.

15. The virtual anchor point-based wireless positioning device as claimed in claim 9, wherein when the effective positioning condition is not met, bases for the virtual anchor point selection module to select the at least one virtual image from the virtual images of the multiple paths of the signal transmission station as the at least one positioning virtual anchor point are that:

a path signal strength of the corresponding path exceeds a second preset threshold; and last few continuous virtual image position changes of each path of the signal transmission station are smaller than a third preset threshold.

16. The virtual anchor point-based wireless positioning device as claimed in claim 9, wherein when the position calculation module obtains the current position information according to the effective positioning condition and the at least one positioning virtual anchor point, the at least one positioning virtual anchor point is at least one selected positioning virtual anchor point of which signal strength exceeds a fourth preset threshold.

17. A terminal, comprising the virtual anchor point-based wireless positioning device as claimed in claim 9.

18. The virtual anchor point-based wireless positioning method as claimed in claim 5, wherein calculating the virtual image position information of each path of the signal transmission station according to the positioning data and the propagation distance information of each path of the signal transmission station comprises:

selecting, from storage records of the positioning data, at least three pieces of positioning data of which effective position differences are greater than a first preset threshold;

extracting the corresponding path propagation distance information from storage records of the path propagation distances according to time indexes of the positioning data; and calculating a virtual image position of each path of the signal transmission station according to the positioning data and the path propagation distances.

* * * * *